US012579008B2

(12) United States Patent
Fang et al.

(10) Patent No.: US 12,579,008 B2
(45) Date of Patent: Mar. 17, 2026

(54) CABINET MONITORING SYSTEM, METHOD, AND APPARATUS, AND ELECTRONIC DEVICE, AND COMPUTER STORAGE MEDIUM

(71) Applicant: VERTIV TECH (XI'AN) CO., LTD., Shaanxi (CN)

(72) Inventors: Jijun Fang, Shaanxi (CN); Xing Li, Shaanxi (CN); Zebo Yan, Shaanxi (CN)

(73) Assignee: VERTIV TECH (XI'AN) CO., LTD., Xi'an (CN)

( * ) Notice: Subject to any disclaimer, the term of this patent is extended or adjusted under 35 U.S.C. 154(b) by 484 days.

(21) Appl. No.: 18/038,543

(22) PCT Filed: Feb. 10, 2021

(86) PCT No.: PCT/CN2021/076439
§ 371 (c)(1),
(2) Date: May 24, 2023

(87) PCT Pub. No.: WO2022/110556
PCT Pub. Date: Jun. 2, 2022

(65) Prior Publication Data
US 2024/0004724 A1     Jan. 4, 2024

(30) Foreign Application Priority Data

Nov. 25, 2020    (CN) .......................... 202011341345.5

(51) Int. Cl.
*H04Q 1/24*          (2006.01)
*G06F 9/50*          (2006.01)
*H04L 12/24*         (2006.01)

(52) U.S. Cl.
CPC .................................. *G06F 9/5088* (2013.01)

(58) Field of Classification Search
CPC .......... G06F 9/5088; H04L 12/24; H04Q 1/24
(Continued)

(56) References Cited

U.S. PATENT DOCUMENTS

| 5,220,517 A | 6/1993 | Sierk et al. |
| 2014/0173299 A1 | 6/2014 | McKnight et al. |
| 2018/0206008 A1* | 7/2018 | Shi ......................... H04Q 1/025 |

FOREIGN PATENT DOCUMENTS

| CN | 101998813 A | 3/2011 |
| CN | 206862517 U | 1/2018 |

(Continued)

OTHER PUBLICATIONS

International Search Report of the ISA issued in PCT/CN2021/076439, mailed Aug. 3, 2021; ISA/CN.

(Continued)

*Primary Examiner* — Jude Jean Gilles
(74) *Attorney, Agent, or Firm* — Harness, Dickey & Pierce, P.L.C.

(57)          ABSTRACT

A cabinet monitoring system, method, and apparatus, and an electronic device, and a computer storage medium are provided. Cabinet monitoring devices (KG) acquiring all monitoring data of connected monitored devices (S); generating cabinet control data according to a part of the monitoring data; sending the cabinet control data to the monitored devices (S); uploading a part of the monitoring data to an upper layer monitoring device (KS); receiving upper layer control data of the upper layer monitoring device (KS), and forwarding the upper layer control data to the monitored devices (S); and the upper layer monitoring device (KS) receiving the monitoring data uploaded by each cabinet monitoring device (KG), determining the upper layer control data according to the received monitoring data, and sending the upper layer control data to the cabinet monitoring devices (KG).

15 Claims, 5 Drawing Sheets

(58) Field of Classification Search
USPC .......................................................... 709/232
See application file for complete search history.

(56)                          References Cited

FOREIGN PATENT DOCUMENTS

| CN | 107888440 A | 4/2018 |
| CN | 207397044 U | 5/2018 |
| CN | 109618138 A | 4/2019 |

OTHER PUBLICATIONS

Extended European Search Report regarding Application No. 21896076. 3, dated Apr. 24, 2024.

* cited by examiner

CABINET MONITORING SYSTEM, METHOD, AND APPARATUS, AND ELECTRONIC DEVICE, AND COMPUTER STORAGE MEDIUM

This application is a 371 U.S. National Phase of International Application No. PCT/CN2021/076439 filed on Feb. 10, 2021, which claims the priority to Chinese Patent Application No. 202011341345.5, titled "CABINET MONITORING SYSTEM, METHOD, AND APPARATUS, AND ELECTRONIC DEVICE, AND COMPUTER STORAGE MEDIUM", filed on Nov. 25, 2020, with the China National Intellectual Property Administration, which are incorporated herein by reference in their entirety.

FIELD

The present disclosure relates to the technical field of computers, and in particular to a cabinet monitoring system, a cabinet monitoring method, a cabinet monitoring apparatus, an electronic device, and a computer storage medium.

BACKGROUND

At present, in the field of monitoring data center infrastructures, a centralized monitoring device is adopted to monitor an entire system in a module room including multiple cabinets according to conventional technology. The monitoring device for the entire system are connected to monitored devices the in multiple cabinets through cables via a cabinet where a collector is deployed.

In an implementation process, during performing deployment based on the above solution, cable identification and troubleshooting is complex, and adding devices in a later stage is complex. In addition, due to the limited interfaces and performance of the centralized monitoring device, it is impossible to monitor a large number of monitored devices.

SUMMARY

A cabinet monitoring system, a cabinet monitoring method, a cabinet monitoring apparatus, an electronic device, and a computer storage medium are provided according to the embodiments of the present disclosure, to solve the problem of a single centralized monitoring device being unable to monitor a large number of monitored devices due to limited interfaces and performance of the single centralized monitoring device according to the conventional technology.

A cabinet monitoring system is provided according to an embodiment of the present disclosure. The cabinet monitoring system includes an upper layer monitoring device and multiple cabinets. Each of the cabinets includes a cabinet monitoring device and multiple monitored devices connected to the cabinet monitoring device. The upper layer monitoring device is connected to each of cabinet monitoring devices.

For each of the cabinet monitoring devices, the cabinet monitoring device is configured to: collect monitoring data of the monitored devices connected to the cabinet monitoring device, generate cabinet control data based on a part of the monitoring data, transmit the cabinet control data to the monitored devices, upload a part of the monitoring data to the upper layer monitoring device, receive upper layer control data from the upper layer monitoring device, and forward the upper layer control data to the monitored devices.

The upper layer monitoring device is configured to: receive monitoring data uploaded by each of cabinet monitoring devices, determine upper layer control data based on the received monitoring data, and transmit the upper layer control data to the cabinet monitoring device.

In an embodiment, data is transmitted between the cabinet monitoring devices and the upper layer monitoring device in a transparent transmission mode.

In an embodiment, each of the cabinet monitoring devices is configured to: collect raw monitoring data of the monitored devices connected to the cabinet monitoring device, convert a part of the raw monitoring data to final monitoring data in a unified predetermined format, and upload the final monitoring data to the upper layer monitoring device; and/or receive upper layer raw control data from the upper layer monitoring device, convert the upper layer raw control data to a final upper layer control data in a format corresponding to the monitored devices, and transmit the final upper layer control data to the corresponding monitored devices.

In an embodiment, each of the cabinet monitoring devices is further configured to: monitor a computing load of the cabinet monitoring device itself, and upload the monitored computing load to the upper layer monitoring device. The upper layer monitoring device is further configured to: monitor a computing load of the upper layer monitoring device itself; and based on computing loads uploaded by the cabinet monitoring devices, control a device having an excessive computing load to transfer a part of the computing task to a low computing load device for processing, and control the low computing load device to transmit a result of the computing task to the device having the excessive computing load. The device having the excessive computing load is a cabinet monitoring device or the upper layer monitoring device that has a computing load exceeding a predetermined load threshold, and the low computing load device is a cabinet monitoring device or the upper layer monitoring device that is determined by the upper layer monitoring device and has a computing load not exceeding the predetermined load threshold.

In an embodiment, if each of the device having the excessive computing load and the low computing load device is one of cabinet monitoring devices, the upper layer monitoring device is configured to: forward the computing task and/or the result of the computing task between the device having the excessive computing load and the device having the low computing load device.

In an embodiment, each of the cabinet monitoring devices is further configured to: monitor a current available storage capacity of the cabinet monitoring device itself, and upload the monitored current available storage capacity to the upper layer monitoring device. The upper layer monitoring device is further configured to: monitor a current available storage capacity of the upper layer monitoring device itself, and control a device having an excessive storage load to transfer a part of data to a low storage load device for storage. The device having the excessive storage load is a cabinet monitoring device or the upper layer monitoring device that has a current storage capacity lower than a predetermined storage capacity threshold, and the low storage load device is a cabinet monitoring device or the upper layer monitoring device that has a current storage capacity higher than the predetermined storage capacity threshold.

Based on the same concept, a cabinet monitoring method is provided according to an embodiment of the present disclosure. The method is applied to a cabinet monitoring device. The method includes: collecting monitoring data of the monitored devices of the cabinet corresponding to the cabinet monitoring device, and uploading a part of the monitoring data to an upper layer monitoring device; generating cabinet control data based on a part of the monitoring data, and transmitting the cabinet control data to the monitored devices; and receiving upper layer control data from the upper layer monitoring device, and transmitting the upper layer control data to the monitored devices.

In an embodiment, the collecting monitoring data of the monitored devices of a cabinet corresponding to the cabinet monitoring device and uploading a part of the monitoring data to an upper layer monitoring device includes: collecting, by the cabinet monitoring device, raw monitoring data of the monitored devices of the cabinet corresponding to the cabinet monitoring device, converting, by the cabinet monitoring device, a part of the raw monitoring data to final monitoring data in a unified predetermined format, and uploading, by the cabinet monitoring device, the final monitoring data to the upper layer monitoring device; and/or the receiving upper layer control data from the upper layer monitoring device and transmitting the upper layer control data to the monitored devices includes: receiving upper layer raw control data from the upper layer monitoring device, converting the upper layer raw control data to final upper layer control data in a format corresponding to the monitored devices, and transmitting the final upper layer control data to the monitored devices.

In an embodiment, the cabinet monitoring method further includes: monitoring a computing load of the cabinet monitoring device itself, and uploading the monitored computing load to the upper layer monitoring device; if the cabinet monitoring device is a device having an excessive computing load, under control of the upper layer monitoring device, transferring a part of the computing task to a low computing load device, and receiving a result of the computing task from the low computing load device; and if the cabinet monitoring device is a low computing load device, under control of the upper layer monitoring device, receiving a computing task from a device having an excessive computing load for processing, and transmitting a result of the computing task to the device having the excessive computing load. The device having the excessive computing load is a cabinet monitoring device or the upper layer monitoring device that has a computing load exceeding a predetermined computing load threshold, and the low computing load device is a cabinet monitoring device or the upper layer monitoring device that is determined by the upper layer monitoring device and has a computing load not exceeding the predetermined computing load threshold.

In an embodiment, if the cabinet monitoring device is the device having the excessive computing load and the low computing load device is another cabinet monitoring device, the under control of the upper layer monitoring device, transferring a part of computing task to a low computing load device and receiving a result of the computing task from the low computing load device includes: under the control of the upper layer monitoring device, transferring a part of the computing task to the upper layer monitoring device, where the upper layer monitoring device forwards the computing task to the low computing load device for processing; if the cabinet monitoring device is the low computing load device and the device having the excessive computing load is another cabinet monitoring device, receiving a computing task from a device having an excessive computing load for processing includes: receiving the computing task from the device having the excessive computing load through the upper layer monitoring device, and processing the computing task; and/or if the cabinet monitoring device is the device having the excessive computing load and the low computing load device is another cabinet monitoring device, the under control of the upper layer monitoring device, receiving a result of the computing task from the low computing load device includes: under the control of the upper layer monitoring device, receiving the result of the computing task from the low computing load device through the upper layer monitoring device; and if the cabinet monitoring device is the low computing load device and the device having the excessive computing load is another cabinet monitoring device, the under control of the upper layer monitoring device, transmitting a result of the computing task to the device having the excessive computing load includes: under the control of the upper layer monitoring device, transmitting the result of the computing task to the upper layer monitoring device, where the upper layer monitoring device forwards the result of the computing task to the device having the excessive computing load.

In an embodiment, the cabinet monitoring method further includes: monitoring an available storage capacity of the cabinet monitoring device itself, and uploading the monitored available storage capacity to the upper layer monitoring device; if the cabinet monitoring device is a device having an excessive storage load, under control of the upper layer monitoring device, transferring a part of data to a low storage load device for storage; and if the cabinet monitoring device is a low storage load device, under control of the upper layer monitoring device, receiving data from a device having an excessive storage load, and storing the data. The device having the excessive storage load is a cabinet monitoring device or the upper layer monitoring device that has a current storage capacity lower than a predetermined storage capacity threshold, and the low storage load device is a cabinet monitoring device or the upper layer monitoring device that is determined by the upper layer monitoring device and has a current storage capacity higher than the predetermined storage capacity threshold.

A cabinet monitoring method is further provided according to an embodiment of the present disclosure. The cabinet monitoring method is applied to an upper layer monitoring device. The cabinet monitoring method includes: receiving monitoring data uploaded by a cabinet monitoring device; generating upper layer control data based on the received monitoring data; and transmitting the upper layer control data to the cabinet monitoring device.

In an embodiment, the cabinet monitoring method further includes: receiving a computing load uploaded by the cabinet monitoring device; monitoring a computing load of the upper layer monitoring device itself; and controlling a device having an excessive computing load to transfer a part of the computing task to a low computing load device for processing, and controlling the low computing load device to transmit a result of the computing task to the device having the excessive computing load. The device having the excessive computing load is a cabinet monitoring device or the upper layer monitoring device that has a computing load exceeding a predetermined load threshold, and the low computing load device is a cabinet monitoring device or the upper layer monitoring device that is determined by the upper layer monitoring device and has a computing load not exceeding the predetermined load threshold.

In an embodiment, if each of the device having the excessive computing load and the low computing load device is one of cabinet monitoring devices, a device having an excessive computing load is controlled to transfer a part of a computing task to a low computing load device for processing, which specifically includes: receiving the computing task uploaded by the device having the excessive computing load, and forwarding the computing task to the low computing load device; and/or the controlling the low computing load device to transmit a result of the computing task to the device having the excessive computing load includes: receiving the result of the computing task uploaded by the low computing load device, and forwarding the result of the computing task to the device having the excessive computing load.

In an embodiment, the cabinet monitoring method further includes: receiving an available storage capacity uploaded by the cabinet monitoring device; monitoring an available storage capacity of the upper layer monitoring device itself; and controlling a device having an excessive storage load to transfer a part of data to a low storage load device for storage. The device having the excessive storage load is a cabinet monitoring device or the upper layer monitoring device that has a storage capacity lower than a predetermined storage capacity threshold, and the device having the low storage load is a cabinet monitoring device or the upper layer monitoring device that has a storage capacity higher than the predetermined storage capacity threshold.

Based on the same concept, a cabinet monitoring apparatus is further provided according to an embodiment of the present disclosure. The cabinet monitoring apparatus is applied to a cabinet monitoring device. The cabinet monitoring apparatus includes: a collection module, a cabinet control module, and a reception module. The collection module is configured to collect monitoring data of the monitored devices of the cabinet corresponding to the cabinet monitoring device and upload a part of the monitoring data to an upper layer monitoring device. The cabinet control module is configured to generate cabinet control data based on a part of the monitoring data and transmit the cabinet control data to the monitored devices. The reception module is configured to receive upper layer control data from the upper layer monitoring device and transmit the upper layer control data to the monitored devices.

A cabinet monitoring apparatus is further provided according to an embodiment of the present disclosure. The cabinet monitoring apparatus is applied to an upper layer monitoring device. The cabinet monitoring apparatus includes: a report reception module, an upper layer control module, and a transmission module. The report reception module is configured to receive monitoring data uploaded by a cabinet monitoring device. The upper layer control module is configured to generate upper layer control data based on the received monitoring data. The transmission module is configured to transmit the upper layer control data to the cabinet monitoring device.

Based on the same concept, an electronic device is further provided according to an embodiment of the present disclosure. The electronic device includes: a processor and a memory storing instructions to be executed by the processor. The processor is configured to execute the instructions to perform the cabinet monitoring method applied to a cabinet monitoring device or the cabinet monitoring method applied to an upper layer monitoring device.

Based on the same concept, a computer storage medium is further provided according to an embodiment of the present disclosure. The computer storage medium stores a computer program. The computer program, when executed by a computer, causes the computer to perform the cabinet monitoring method applied to a cabinet monitoring device or the cabinet monitoring method applied to an upper layer monitoring device.

The present disclosure has the following beneficial effects.

The cabinet monitoring system, the cabinet monitoring method, the cabinet monitoring apparatus, the electronic device, and the computer storage medium according to the embodiments of the present disclosure assist the upper layer monitoring device in monitoring the monitored devices of the cabinets with the cabinet monitoring devices, which may greatly improve the access capability of the cabinet monitoring system, reduce the data processing capacity of the upper layer monitoring device for the same monitored device, and improve the data transmission speed of the upper layer monitoring device. Meanwhile, the cabinet monitoring devices are arranged in corresponding cabinets, which may simplify the connection of wiring and reduce the complexity for connecting the monitored devices to the cabinet monitoring system. Furthermore, the cabinet monitoring devices coordinates the computing task and the storage resource with the upper layer monitoring device, which may utilize idle computing and storage resources, and thereby enhance the overall monitoring capability.

DETAILED DESCRIPTION

Figures 1, 2:
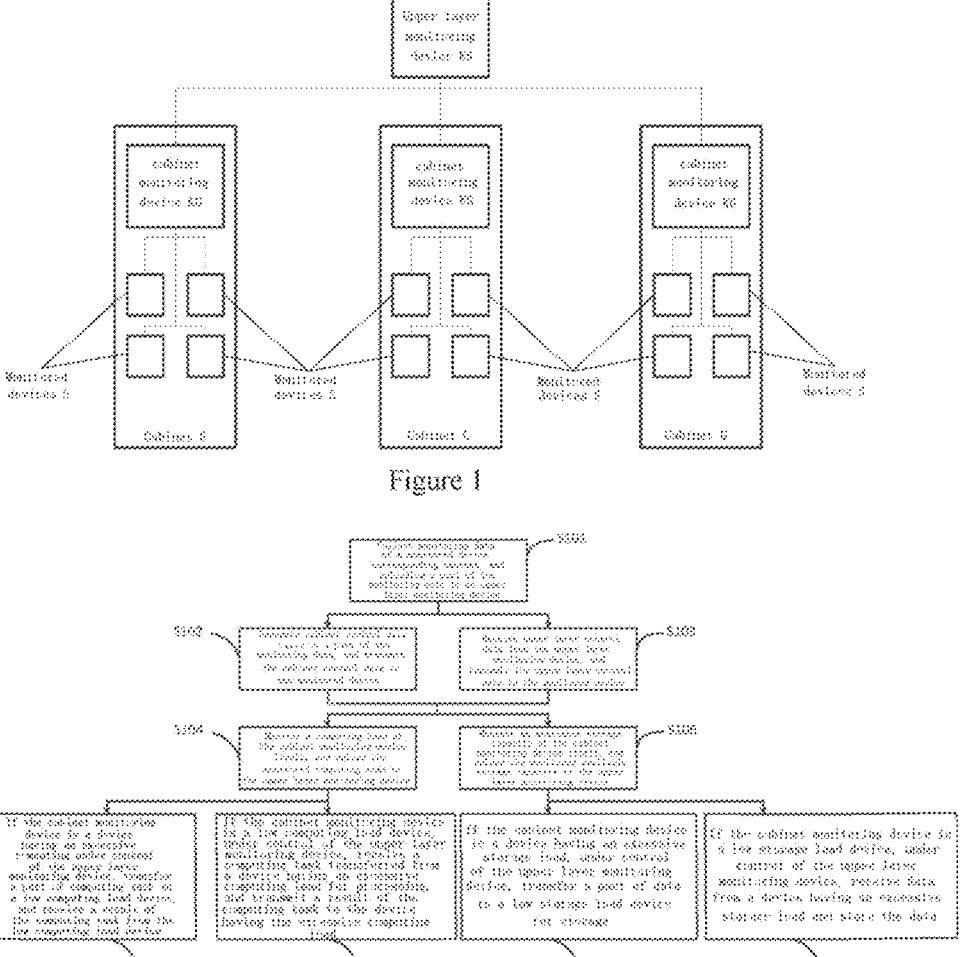
FIG. 1 is a schematic structural diagram of a cabinet monitoring system according to an embodiment of the present disclosure.
FIG. 2 is a flow chart of a cabinet monitoring method applied to a cabinet monitoring device according to an embodiment of the present disclosure.

In order to make the above objectives, features, and advantages of the present disclosure more apparent and understandable, the present disclosure is further described below in conjunction with accompanying drawings and embodiments. The exemplary embodiments may be implemented in multiple manners and should not be limited to the implementations described herein. The embodiments are provided to make the present disclosure more comprehensive and complete, and to comprehensively provide the concept of the exemplary embodiments to those skilled in the art. The same reference numerals in the Figures represent the same or similar structures, so repeated descriptions are omitted. The terms for describing positions and directions in the present disclosure are illustrated with the accompanying drawings as examples. However, changes may be made according to requirements, and all the changes are within the protection scope of the present disclosure. The accompanying drawings in the present disclosure are only used to illustrate relative position relationship and do not represent true proportions.

It should be noted that details are provided in the following description to facilitate a full understanding of the present disclosure. However, the present disclosure may be implemented in various ways different from the ways described herein, and those skilled in the art may make similar promotions without departing from the content of the present disclosure. Therefore, the present disclosure is not limited by the embodiments disclosed below. Preferred embodiments of the present disclosure are described in the specification, which are intended to illustrate the general principles of the present disclosure rather than to limit the scope of the present disclosure. The protection scope of the present disclosure is determined by the attached claims.

Hereinafter, in conjunction with the accompanying drawings, a cabinet monitoring system, a cabinet monitoring method, a cabinet monitoring apparatus, an electronic device, and a computer storage medium according to the embodiments of the present disclosure are described in detail.

According to an embodiment of the present disclosure, a cabinet monitoring system is provided. As shown in FIG. 1, the cabinet monitoring system includes: an upper layer monitoring device KS and multiple cabinets G. Each of the cabinets includes a cabinet monitoring device KG and multiple monitored devices S connected to the cabinet monitoring device KG. The upper layer monitoring device KS is connected to each of cabinet monitoring devices KG.

For each of the cabinet monitoring devices, the cabinet monitoring device KG is configured to: collect monitoring data of the monitored devices S connected to the cabinet monitoring device KG, generate cabinet control data based on a part of the monitoring data, transmit the cabinet control data to the monitored devices S, upload a part of the monitoring data to the upper layer monitoring device KS, receive upper layer control data from the upper layer monitoring device KS, and forward the upper layer control data to the monitored devices S.

The upper layer monitoring device KS is configured to: receive monitoring data uploaded by each of the cabinet monitoring devices KG, determine upper layer control data based on the received monitoring data, and transmit the upper layer control data to the corresponding cabinet monitoring device KG.

In specific implementations, the monitoring data of the monitored devices S may include: a temperature, a humidity, a wind speed, an air pressure, a voltage, a current, a circuit resistance, a power, an alternative current frequency, a power factor, a fault state, a fire state, an anti-theft state, an operation state and the like, which is not limited herein.

Figure 3:
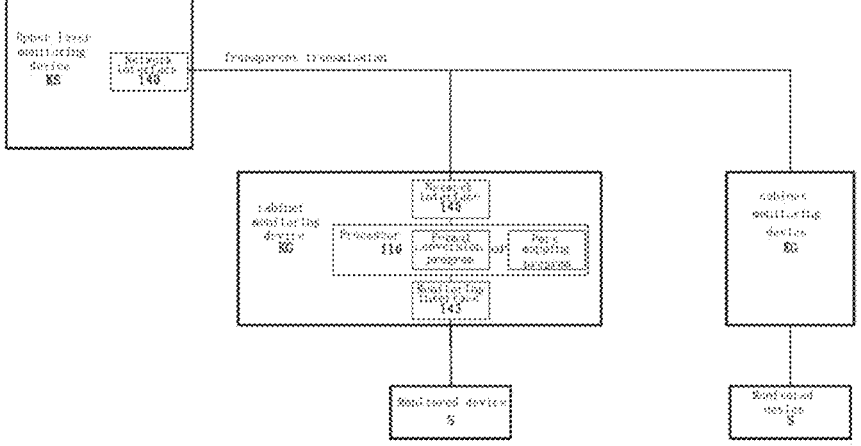
FIG. 3 is a schematic diagram showing the manner of data transmission of a cabinet monitoring system according to an embodiment of the present disclosure.

In specific implementations, as shown in FIG. 3, the cabinet monitoring device KG uploads a part of the monitoring data to the upper layer monitoring device KS by directly uploading a part of the monitoring data without converting the format of the monitoring data or converting collected raw monitoring data to final monitoring data in a unified predetermined format and then uploading the final monitoring data to the upper layer monitoring device KS. The cabinet monitoring device KG receives upper layer control data from the upper layer monitoring device KS and forwards the upper layer control data to the monitored devices S by: directly receiving and forwarding the upper layer control data; or receiving the upper layer control data, and converting the upper layer control data to data in a format corresponding to that of the monitored devices S, and then forwarding the data; or in a port mapping manner, directly transmitting the upper control data from the upper control device KS to a port of the cabinet monitoring device KG where the port is connected to the monitored device S. How the cabinet monitoring device KG receives the upper layer control data from the upper layer monitoring device KS and forwards the upper layer control data to the monitored devices S is not limited herein.

In specific implementations, the cabinet monitoring device KG assists the upper layer monitoring device KS in monitoring the monitored devices S and undertakes some monitoring task. For example, the cabinet monitoring device KG undertakes a device failure emergency control function. When a monitored device S experiences an emergency fault, the cabinet monitoring device KG collects corresponding fault state monitoring data and directly transmits an emergency stop command to the monitored device S. In this way, it is unnecessary to transmit monitoring data to the upper layer monitoring device KS and then to perform control by the upper layer monitoring device KS, optimizing the control effect.

In specific implementations, the part of the monitoring data based on which the cabinet monitoring device KG generates the cabinet control data may be different from the part of the monitoring data based on which the upper layer monitoring device KS generates the upper layer control data, or the part of the monitoring data based on which the cabinet monitoring device KG generates the cabinet control data and the part of the monitoring data based on which the upper layer monitoring device KS generates the upper layer control data may include the same data. If the part of the monitoring data based on which the cabinet monitoring device KG generates the cabinet control data and the part of the monitoring data based on which the upper layer monitoring device KS generates the upper layer control data include the same data, for the cabinet control data generated by the cabinet monitoring device KG based on the same data and the upper layer control data generated by the upper layer monitoring device KS based on the same data, the upper layer control data has a higher priority in controlling the monitored device S. For example, for a monitoring data indicating a fault state, the monitored device S is controlled to perform operation continuously based on the cabinet control data generated by the cabinet monitoring device KG, and the monitored device S is controlled to stop operation based on the upper layer control data generated by the upper monitoring device, then the monitored device S stops operation.

In this way, by disposing the upper layer monitoring device and the cabinet monitoring device, the cabinet monitoring device may assist the upper layer monitoring device in monitoring the monitored devices, so as to optimize the control effect of the cabinet monitoring system. In addition, one upper layer monitoring device and multiple cabinet monitoring devices monitor all cabinets, thus the number of the cabinet monitoring devices may be configured based on the number of the monitored devices, significantly improving the access capability of the cabinet monitoring system, reducing the data processing capacity of the upper layer monitoring device for the same monitored device, and improving the data transmission speed of the upper layer monitoring device. Meanwhile the cabinet monitoring devices are arranged in corresponding cabinets, which may simplify the connection of wiring and reduce the complexity of connecting the monitored devices to the cabinet monitoring system.

In an embodiment, specifically, as shown in FIG. 1, each of the cabinet monitoring devices is configured to: collect raw monitoring data of the monitored devices S connected to the cabinet monitoring device KG, convert a part of the raw monitoring data to final monitoring data in a unified predetermined format, and upload the final monitoring data to the upper layer monitoring device KS; and/or receive upper layer raw control data from the upper layer monitoring device KS, convert the upper layer raw control data to final upper layer control data in a format corresponding to that of the monitored device S, and transmit the final upper layer control data to the monitored device S.

In specific implementations, data may be transmitted between the cabinet monitoring devices KG and the upper layer monitoring device KS in a transparent transmission mode or in a non-transparent transmission mode.

In this way, the cabinet monitoring device KG converts the format of the data, it is convenient for the upper layer monitoring device to receive, and/or transmit and process the data.

In an embodiment, as shown in FIG. 3, data is transmitted between the cabinet monitoring devices and the upper layer monitoring device in a transparent transmission mode.

With the transparent transmission mode, transmission may be simplified, and transmission speed may be greatly improved.

In an embodiment, each of the cabinet monitoring devices KG is further configured to: monitor a computing load of the cabinet monitoring device KG itself, and upload the monitored computing load to the upper layer monitoring device KS. The upper layer monitoring device KS is further configured to: monitor a computing load of the upper layer monitoring device KS itself; based on computing loads uploaded by the cabinet monitoring devices KG, control a device having an excessive computing load to transfer a part of the computing task to a low computing load device for processing, and control the low computing load device to transmit a result of the computing task to the device having the excessive computing load. Wherein, the device having the excessive computing load is a cabinet monitoring device KG or the upper layer monitoring device KS that has a computing load exceeding a predetermined load threshold, and the low computing load device is a cabinet monitoring device KS determined by the upper layer monitoring device or the upper layer monitoring device KS that has a computing load not exceeding the predetermined load threshold.

In specific implementations, it may be determined, by the cabinet monitoring device KG itself or by the upper layer monitoring device KS, whether a cabinet monitoring device KG is a device having an excessive computing load, which is not limited herein. It is determined by the upper layer monitoring device KS itself whether the upper layer monitoring device KS is computing overloaded. In a case that the computing load of the upper layer monitoring device KS does not exceed a corresponding computing load threshold, the upper layer monitoring device KS may determine the upper layer monitoring device KS itself as a low computing load device to assist in processing a computing task of a device having an excessive computing load.

In specific implementations, the upper layer monitoring device KS may control the device having the excessive computing load to transfer a part of the computing task to the low computing load device for processing by: controlling the device having the excessive computing load to upload a part of the computing task to the upper layer monitoring device KS, and then forwarding the received computing task to the low computing load device; or instructing the device having the excessive computing load to directly transfer a part of computing task to the low computing load device, but embodiments of the present disclosure are not limited thereto. The upper layer monitoring device KS may control the low computing load device to transmit the result of the computing task to the device having the excessive computing load by: receiving the result of the computing task uploaded by the low computing load device and then forwarding the computing task to the device having the excessive computing load; or instructing the low computing load device to directly transmit the result of the computing task to the device having the excessive computing load, but embodiments of the present disclosure are not limited thereto.

Figure 4:
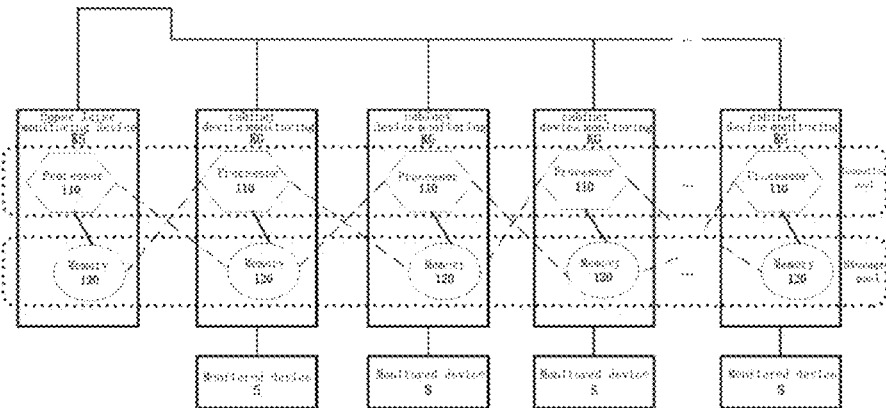
FIG. 4 is a schematic diagram showing the effect for a method of a cabinet monitoring system according to an embodiment of the present disclosure.

In this way, as shown in FIG. 4, the low computing load device assists in processing the computing task of the device having the excessive computing load, which may coordinate the computing load between devices in the cabinet monitoring system, form a shared computing pool in the cabinet monitoring system, utilize idle computing resources, and improve the overall monitoring capability.

In an embodiment, if each of the device having the excessive computing load and the low computing load device is one of cabinet monitoring devices KG, the upper layer monitoring device KS is configured to: forward the computing task and/or the result of the computing task between the device having the excessive computing load and the low computing load device.

In this way, the upper layer monitoring device KS forwards the computing task and/or the result of the computing task, which may simplify the manner of communication connection in the cabinet monitoring system.

In an embodiment, each of the cabinet monitoring devices KG is further configured to: monitor a current available storage capacity of the cabinet monitoring device KG itself, and upload the monitored current available storage capacity to the upper layer monitoring device KS. The upper layer monitoring device KS is further configured to: monitor a current available storage capacity of the upper layer monitoring device KS itself, and control a device having an excessive storage load to transfer a part of data to a low storage load device for storage. The device having the excessive storage load is a cabinet monitoring device KG or the upper layer monitoring device KS that has a current storage capacity lower than a predetermined storage capacity threshold, and the device having the low storage load is a cabinet monitoring device KG or the upper layer monitoring device KS that has a current storage capacity higher than the predetermined storage capacity threshold.

In specific implementations, it may be determined, by the cabinet monitoring device KG itself or by the upper layer monitoring device KS, whether a cabinet monitoring device KG is storage overloaded, which is not limited herein. It is determined by the upper layer monitoring device KS itself whether the upper layer monitoring device KS is storage overloaded. If the storage load of the upper layer monitoring device KS is higher than a corresponding predetermined storage capacity threshold, the upper layer monitoring device KS may determine the upper layer monitoring device KS itself as a low storage load device to assist in storing a part of data of a device having an excessive storage load.

In specific implementations, the upper layer monitoring device KS may control the device having the excessive storage load to transfer a part of data to the device having the low storage load for storage by: controlling the device having the excessive storage load to upload a part of data to the upper layer monitoring device KS, and then forwarding the received data to the device having the low storage load; or instructing the device having the excessive storage load to directly transfer a part of the data to the device having the low storage load, but embodiments of the present disclosure are not limited thereto. Correspondingly, when the device having the excessive storage load needs to read the data stored by the device having the low storage load, the device having the excessive storage load may directly transmit a data acquisition request to the device having the low storage load and then receive the data transmitted by the device having the low storage load, or may transmit an acquisition request to the upper layer monitoring device KS, and the upper layer monitoring device KS obtains corresponding data from the device having the low storage load and forwards the data to the device having the excessive storage load, but embodiments of the present disclosure are not limited thereto.

In this way, as shown in FIG. 4, by assisting in storing data of the device having the excessive storage load with the device having the low storage load, the storage capacities may be coordinated among the devices in the cabinet monitoring system, so as to form a shared storage pool in the cabinet monitoring system, utilize idle storage resources, and improve the overall monitoring capability.

Based on the same concept, a cabinet monitoring method is further provided according to an embodiment of the present disclosure. The cabinet monitoring method is applied to a cabinet monitoring device. As shown in FIG. 2, the cabinet monitoring method includes the following steps.

In step S101, monitoring data of the monitored devices of a cabinet corresponding to the cabinet monitoring device is collected, and a part of the monitoring data is uploaded to an upper layer monitoring device.

In step S102, cabinet control data is generated based on a part of the monitoring data, and the cabinet control data is transmitted to the monitored devices.

In step S103, upper layer control data is received from the upper layer monitoring device, and the upper layer control data is transmitted to the monitored devices.

In specific implementations, in the step S101, the collected monitoring data may include: a temperature, a humidity, a wind speed, an air pressure, a voltage, a current, a circuit resistance, a power, an alternative current frequency, a power factor, a fault state, a fire state, an anti-theft state, an operation state and the like, but embodiments of the present disclosure are not limited thereto.

In specific implementations, in the step S101, a part of the monitoring data may be uploaded to the upper layer monitoring device by: directly uploading the monitoring data without converting the format of the monitoring data, or converting collected raw monitoring data to final monitoring data in a unified predetermined format and then uploading the final monitoring data to the upper layer monitoring device, but embodiments of the present disclosure are not limited thereto.

In specific implementations, the part of the monitoring data uploaded to the upper layer monitoring device in step S101 may be different from the part of the monitoring data based on which the cabinet control data is generated in step S102, or the part of the monitoring data uploaded to the upper layer monitoring device in step S101 and the part of the monitoring data based on which the cabinet control data is generated in step S102 may include the same data. In a case that the part of the monitoring data uploaded to the upper layer monitoring device in step S101 and the part of the monitoring data based on which the cabinet control data is generated in step S102 include same data, for the cabinet control data generated by a cabinet monitoring device based on the same data and the corresponding upper layer control data received from the upper layer monitoring device based on the same data, the upper layer control data has a higher priority in controlling the monitored device. For example, for a monitoring data indicating a fault state, the monitored device is controlled to perform operation continuously based on the cabinet control data generated by the cabinet monitoring device, and the monitored device is controlled to stop operation based on the corresponding upper layer control data generated received from the upper monitoring device, then the monitored device stops operation.

In this way, with the cabinet monitoring method, the collected monitoring data is analyzed and controlled by the upper layer monitoring device and the cabinet monitoring device, and the cabinet monitoring device assists the upper layer monitoring device in monitoring the monitored devices, optimizing the control effect of the cabinet monitoring system. In addition, one upper layer monitoring device and multiple cabinet monitoring devices monitor all cabinets, thus the number of the cabinet monitoring devices may be configured based on the number of the monitored devices, greatly improving the access capability of the cabinet monitoring system, reducing the data processing capacity of the upper layer monitoring device for the same monitored device, and improving the data transmission speed of the upper layer monitoring device. Furthermore, the cabinet monitoring devices are arranged in corresponding cabinets, which may simplify the connection of wiring and reduce the complexity of connecting the monitored devices to the cabinet monitoring system.

In an embodiment, the step S101 in which the monitoring data of the monitored devices of the cabinet corresponding to the cabinet monitoring device is collected and a part of the monitoring data is uploaded to the upper layer monitoring device is performed by: collecting, by the cabinet monitoring device, raw monitoring data of the monitored devices of the cabinet corresponding to the cabinet monitoring device, converting, by the cabinet monitoring device, a part of the raw monitoring data to final monitoring data in a unified predetermined format, and uploading, by the cabinet monitoring device, the final monitoring data to the upper layer monitoring device; and/or the step S103 in which upper layer control data is received from the upper layer monitoring device and the upper layer control data is transmitted to the monitored devices is performed by: receiving upper layer raw control data from the upper layer monitoring device, converting the upper layer raw control data to final upper layer control data in a format corresponding to the monitored devices, and transmitting the final upper layer control data to the monitored devices.

In this way, the format of the data is converted, facilitating the upper layer monitoring device receiving, and/or transmitting and processing the data.

In an embodiment, the cabinet monitoring method further includes the following steps.

In step S104, a computing load of the cabinet monitoring device itself is monitored, and the monitored computing load is uploaded to the upper layer monitoring device.

In step S1051, if the cabinet monitoring device is a device having an excessive computing load, under control of the upper layer monitoring device, a computing task is transferred to a low computing load device, and a result of the computing task is received from the low computing load device.

In step S1052, if the cabinet monitoring device is a low computing load device, under control of the upper layer monitoring device, a computing task is received from a device having an excessive computing load for processing, and a result of the computing task is transmitted to the device having the excessive computing load.

Wherein the device having the excessive computing load is a cabinet monitoring device or the upper layer monitoring device that has a computing load exceeding a predetermined computing load threshold. The low computing load device is a cabinet monitoring device or the upper layer monitoring device that is determined by the upper layer monitoring device and has a computing load not exceeding the predetermined computing load threshold.

In specific implementations, it may be determined, by the cabinet monitoring device itself or by the upper layer monitoring device, whether a cabinet monitoring device is a device having an excessive computing load, but embodiments of the present disclosure are not limited thereto.

In specific implementations, the step S1051 in which the part of the computing task is transferred to the low computing load device under the control of the upper layer monitoring device may be performed by: under the control of the upper layer monitoring device, uploading, by the device having the excessive computing, the computing task to the upper layer monitoring device, and then forwarding, by the upper layer monitoring device, the received computing task to the low computing load device; or in response to an instruction from the upper layer monitoring device, directly transferring the part of the computing task to the low computing load device, but embodiments of the present disclosure are not limited thereto. The step S1052 in which the result of the computing task is transmitted to the device having the excessive computing load under the control of the upper layer monitoring device may be performed by: transmitting the result of the computing task to the upper layer monitoring device, and then forwarding, by the upper layer monitoring device, the result of the computing task to the device having the excessive computing load; or in response to an instruction from the upper layer monitoring device, directly transmitting the result of the computing task to the device having the excessive computing load, but embodiments of the present disclosure are not limited thereto.

In this way, as shown in FIG. 4, the low computing load device assists in processing the computing task of the device having the excessive computing load, coordinating the computing load between devices in the cabinet monitoring system, forming a shared computing pool in the cabinet monitoring system, utilizing idle computing resources, and improving the overall monitoring capability.

In an embodiment, in the step S1051, if the cabinet monitoring device is the device having the excessive computing load and the low computing load device is another cabinet monitoring device, under control of the upper layer monitoring device, the part of the computing task is transferred to the low computing load device and the result of the computing task is received from the low computing load device. Specifically, under the control of the upper layer monitoring device, transferring the part of the computing task to the upper layer monitoring device, which is forwarded to the low computing load device by the upper layer monitoring device for processing;

In the step S1052, if the cabinet monitoring device is the low computing load device and the device having the excessive computing load is another cabinet monitoring device, the computing task is received from the device having the excessive computing load for processing. Specifically, the computing task from the device having the excessive computing load is received through the upper layer monitoring device for processing.

In an embodiment, in the step S1051, if the cabinet monitoring device is the device having the excessive computing load and the low computing load device is another cabinet monitoring device, under control of the upper layer monitoring device, the result of the computing task is received from the low computing load device includes: under the control of the upper layer monitoring device, receiving the result of the computing task from the low computing load device through the upper layer monitoring device.

In an embodiment, in the step S1052, if the cabinet monitoring device is the low computing load device and the device having the excessive computing load is another cabinet monitoring device, under control of the upper layer monitoring device, the result of the computing task is transmitted to the device having the excessive computing load includes: under the control of the upper layer monitoring device, transmitting the result of the computing task to the upper layer monitoring device, where the upper layer monitoring device forwards the result of the computing task to the device having the excessive computing load.

In this way, with the cabinet monitoring method, the upper layer monitoring device forwards the computing task and/or the result of the computing task, so as to simplify the communication connection in the cabinet monitoring system.

In an embodiment, the cabinet monitoring method further includes the following steps.

In step S106, an available storage capacity of the cabinet monitoring device itself is monitored, and the monitored available storage capacity is uploaded to the upper layer monitoring device.

In step S1071, in a case that the cabinet monitoring device is a device having an excessive storage load, under control of the upper layer monitoring device, a part of data is transferred to a low storage load device for storage.

In step S1072, if the cabinet monitoring device is a low storage load device, under control of the upper layer monitoring device, data is received from a device having an excessive storage load, and storing the data.

The device having the excessive storage load is a cabinet monitoring device or the upper layer monitoring device that has a current storage capacity lower than a predetermined storage capacity threshold. The device having the low storage load is a cabinet monitoring device or the upper layer monitoring device that is determined by the upper layer monitoring device and has a current storage capacity higher than the predetermined storage capacity threshold.

In specific implementations, it may be determined, by the cabinet monitoring device itself or by the upper layer monitoring device, whether a cabinet monitoring device is storage overloaded, but embodiments of the present disclosure are not limited thereto.

In specific implementations, the device having the excessive storage load transferring a part of data to the device having the low storage load for storage under control of the upper layer monitoring device may be performed by: under the control of the upper layer monitoring device, uploading, by the device having the excessive storage load, a part of data to the upper layer monitoring device KS, and then forwarding, by the upper layer monitoring device, the received data to the device having the low storage load; or in response to an instruction from the upper layer monitoring device, directly transferring, by the device having the excessive storage load, a part of the data to the device having the low storage load for storage, but embodiments of the present disclosure are not limited thereto. Correspondingly, when the device having the excessive storage load needs to read the data stored by the device having the low storage load, the device having the excessive storage load may directly transmit a data acquisition request to the device having the low storage load and then receive the data transmitted by the device having the low storage load, or may transmit an acquisition request to the upper layer monitoring device and then receive the data forwarded by the upper layer monitoring device that is obtained from the device having the low storage load, but embodiments of the present disclosure are not limited thereto.

In this way, as shown in FIG. 4, the device having the low storage load assists in storing data of the device having the excessive storage load, coordinating the storage capacities of the devices in the cabinet monitoring system, forming a shared storage pool in the cabinet monitoring system, utilizing idle storage resources, and improving the overall monitoring capability.

Figures 5, 6:
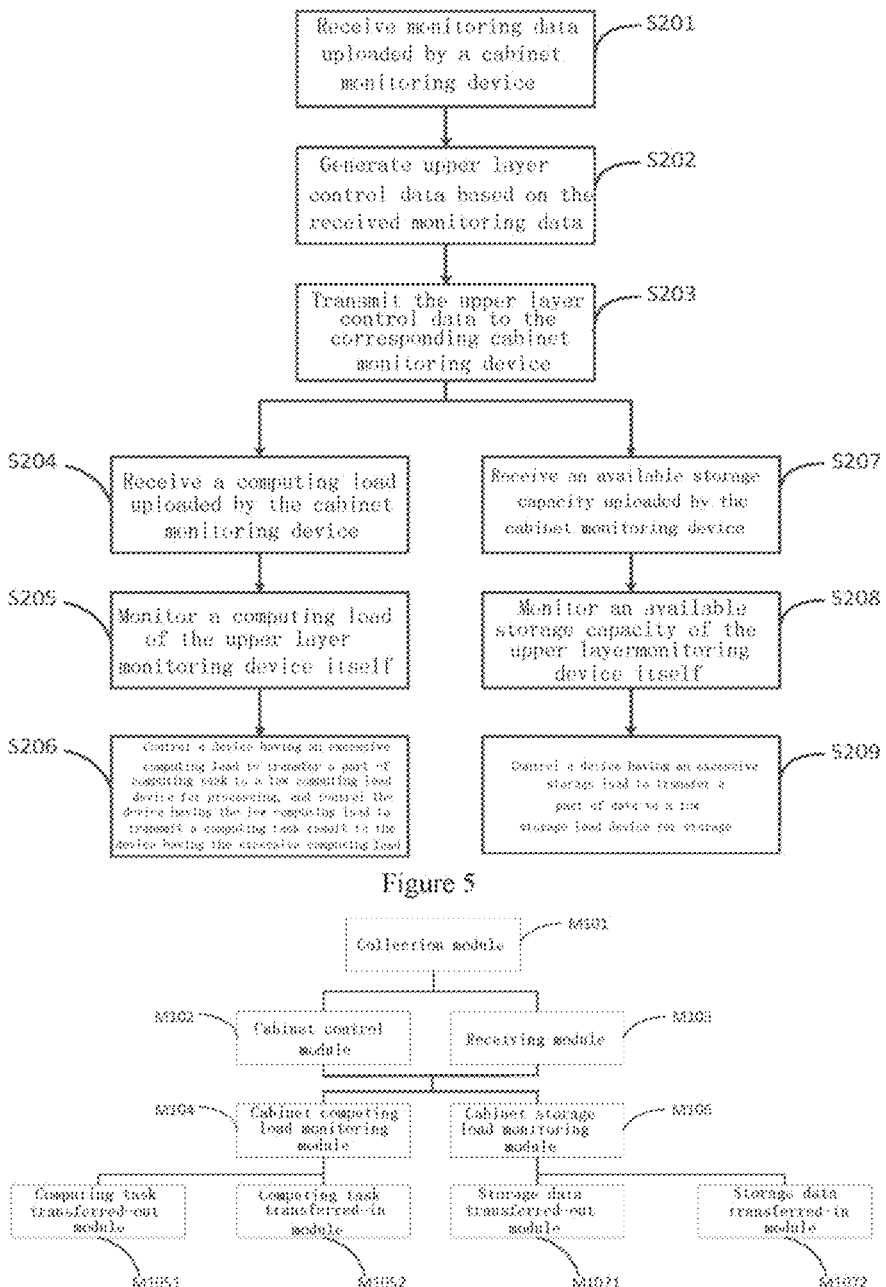
FIG. 5 is a flow chart of a cabinet monitoring method applied to an upper layer monitoring device according to an embodiment of the present disclosure.
FIG. 6 is a schematic structural diagram of a cabinet monitoring apparatus applied to a cabinet monitoring device according to an embodiment of the present disclosure.

A cabinet monitoring method is further provided according to an embodiment of the present disclosure. The cabinet monitoring method is applied to an upper layer monitoring device. As shown in FIG. 5, the cabinet monitoring method includes the following steps S201 to S203.

In step S201, the monitoring data uploaded by each cabinet monitoring device is received.

In step S202, the corresponding upper layer control data is generated based on the received monitoring data.

In step S203, the upper layer control data is transmitted to the corresponding cabinet monitoring device.

In this way, with the cabinet monitoring method, based on the assistance of the cabinet monitoring devices, the data processing capacity of the upper layer monitoring device for the same monitored device is reduced, improving the data transmission speed of the upper layer monitoring device, and greatly improving the access capability of the upper layer monitoring device.

In an embodiment, the cabinet monitoring method further includes the following steps S204 to S206.

In step S204, a computing load uploaded by each cabinet monitoring device is received.

In step S205, a computing load of the upper layer monitoring device itself is monitored.

In step S206, a device having an excessive computing load is controlled to transfer a part of the computing task to a low computing load device for processing, and the low computing load device is controlled to transmit a result of the computing task to the device having the excessive computing load.

The device having the excessive computing load is a cabinet monitoring device or the upper layer monitoring device that has a computing load exceeding a predetermined load threshold. The low computing load device is a cabinet monitoring device or the upper layer monitoring device that is determined by the upper layer monitoring device and has a computing load not exceeding the predetermined load threshold.

In specific implementations, if the computing load of the upper layer monitoring device KS does not exceed a computing load threshold, the upper layer monitoring device KS may determine the upper layer monitoring device KS itself as the low computing load device to assist in processing the computing task of the device having the excessive computing load.

In specific implementations, the step S206 in which the device having the excessive computing load is controlled to transfer a part of the computing task to the low computing load device for processing may be performed by: receiving the computing task uploaded by the device having the excessive computing and then forwarding the computing task to the low computing load device; or instructing the device having the excessive computing load to directly transmitting the computing task to the low computing load device, but embodiments of the present disclosure are not limited thereto. The step S206 in which the low computing load device is controlled to transmit the result of the computing task to the device having the excessive computing load may be performed by: receiving the result of the computing task uploaded by the low computing load device and then forwarding the result of the computing task to the device having the excessive computing load; or instructing the low computing load device to directly transmitting the result of the computing task to the device having the excessive computing load, but embodiments of the present disclosure are not limited thereto.

In this way, as shown in FIG. 4, with the cabinet monitoring method, the low computing load device assists in processing the computing task of the device having the excessive computing load, coordinating the computing load between devices in the cabinet monitoring system, forming a shared computing pool in the cabinet monitoring system, utilizing idle computing resources, and improving the overall monitoring capability.

In an embodiment, if each of the device having the excessive computing load and the low computing load device is one of cabinet monitoring devices, the step S206 in which the device having an excessive computing load is controlled to transfer a part of the computing task to the low computing load device for processing includes: receiving the computing task uploaded by the device having the excessive computing load, and forwarding the computing task to the low computing load device; and/or the step S206 in which the low computing load device is controlled to transmit the result of the computing task to the device having the excessive computing load includes: receiving the result of the computing task uploaded by the low computing load device, and forwarding the result of the computing task to the device having the excessive computing load.

In this way, with the cabinet monitoring method, the upper layer monitoring device forwards the computing task and/or the result of the computing task, simplifying the communication connection in the cabinet monitoring system.

In an embodiment, the cabinet monitoring method further includes the following steps S207, S208 and S209.

In step S207, an available storage capacity is received uploaded by the cabinet monitoring device.

In step S208, an available storage capacity of the upper layer monitoring device itself is monitored.

In step S209, a device having an excessive storage load is controlled to transfer a part of data to a low storage load device for storage.

The device having the excessive storage load is a cabinet monitoring device or the upper layer monitoring device that has a storage capacity lower than a predetermined storage capacity threshold, and the device having the low storage load is a cabinet monitoring device or the upper layer monitoring device that has a storage capacity higher than the predetermined storage capacity threshold.

In specific implementations, if the storage load of the upper layer monitoring device exceeds the predetermined storage capacity threshold, the upper layer monitoring device may determine the upper layer monitoring device itself as the device having the low storage load to assist in storing a part of data of the device having the excessive storage load.

In specific implementations, the step S209 in which the device having the excessive storage load is controlled to transfer a part of data to the device having the low storage load for storage may be performed by: controlling the device having the excessive storage load to updating a part of data to the upper layer monitoring device, and then forwarding the received data to the device having the low storage load; or instructing the device having the excessive storage load to directly transfer a part of data to the device having the low storage load for storage. How the device having the excessive storage load is controlled to transfer a part of data to the device having the low storage load for storage is not limited herein. Correspondingly, when the device having the excessive storage load needs to read the data stored by the device having the low storage load, the device having the excessive storage load may directly transmit a data acquisition request to the device having the low storage load based on a record of previously transferring a part of data to the device having the low storage load under the control of the upper monitoring device, and then receives the data transmitted by the device having the low storage load; or the device having the excessive storage load may transmit an acquisition request to the upper layer monitoring device, and then the upper layer monitoring device receives the corresponding data from the device having the low storage load and forwards the date to the device having the excessive storage load. How the device having the excessive storage load reads the data stored by the device having the low storage load is not limited herein.

In this way, as shown in FIG. 4, with the cabinet monitoring method, the device having the low storage load assists in storing data of the device having the excessive storage load, coordinating the storage capacities of the devices in the cabinet monitoring system, forming a shared storage pool in the cabinet monitoring system, utilizing idle storage resources, and improving the overall monitoring capability.

In specific implementations, as shown in FIG. 4, in an embodiment in which all the above technical solutions are applied, a shared computing pool and a shared storage pool are formed in the cabinet monitoring system, achieving an effect in which a processor 110 of a cabinet monitoring device KG or an upper layer monitoring device KS can read and store data stored in a memory 120 of another cabinet monitoring device KG or another upper layer monitoring device KS, and can perform a computing task of another cabinet monitoring device KG or another upper layer monitoring device KS, and thereby realizing distributed computation and distributed storage. The processor 110 and the memory 120 are not limited to the device where the processor 110 and the memory 120 are arranged.

Based on the same concept, a cabinet monitoring apparatus is further provided according to an embodiment of the present disclosure. The cabinet monitoring apparatus is applied to a cabinet monitoring device. As shown in FIG. 6, the cabinet monitoring apparatus includes a collection module M101, a cabinet control module M102, and a receiving module M103.

The collection module M101 is configured to collect monitoring data of the monitored devices of the cabinet corresponding to the cabinet monitoring device and upload a part of the monitoring data to an upper layer monitoring device.

The cabinet control module M102 is configured to generate cabinet control data based on a part of the monitoring data and transmit the cabinet control data to the monitored devices.

The receiving module M103 is configured to receive upper layer control data from the upper layer monitoring device and transmit the upper layer control data to the monitored devices.

In an embodiment, the collection module M101 is configured to collect monitoring data of the monitored devices of the cabinet corresponding to the cabinet monitoring device and upload a part of the monitoring data to the upper layer monitoring device. Specifically, the cabinet monitoring device is configured to: collect raw monitoring data of the monitored devices of the cabinet corresponding to the cabinet monitoring device, convert a part of the raw monitoring data to final monitoring data in a unified predetermined format, and upload the final monitoring data to the upper layer monitoring device.

In an embodiment, the receiving module M103 is configured to receive the upper layer control data from the upper layer monitoring device and transmit the upper layer control data to the monitored devices. Specifically, the receiving module M103 is configured to receive upper layer raw control data from the upper layer monitoring device, convert the upper layer raw control data to final upper layer control data in a format corresponding to the monitored devices, and transmit the final upper layer control data to the monitored devices.

In an embodiment, the cabinet monitoring apparatus further includes: a cabinet computing load monitoring module M104, a computing task transferred-out module M1051, and a computing task transferred-in module M1052.

The cabinet computing load monitoring module M104 is configured to monitor a computing load of the cabinet monitoring device, and upload the monitored computing load to the upper layer monitoring device.

The computing task transferred-out module M1051 is configured to, if the cabinet monitoring device is a device having an excessive computing load, under control of the upper layer monitoring device, transfer a part of a computing task to a low computing load device, and receive a result of the computing task from the low computing load device.

The computing task transferred-in module M1052 is configured to: if the cabinet monitoring device is a low computing load device, under control of the upper layer monitoring device, receive a computing task transferred from a device having an excessive computing load for processing, and transmit a result of the computing task to the device having the excessive computing load.

The device having the excessive computing load is a cabinet monitoring device or the upper layer monitoring device that has a computing load exceeding a predetermined computing load threshold. The low computing load device is a cabinet monitoring device or the upper layer monitoring device that is determined by the upper layer monitoring device and has a computing load not exceeding the predetermined computing load threshold.

In an embodiment, the computing task transferred-out module M1051 is configured to, if the cabinet monitoring device is the device having the excessive computing load and the low computing load device is another cabinet monitoring device, under the control of the upper layer monitoring device, transfer a part of the computing task to the low computing load device for processing, and receive the result of the computing task from the low computing load device. Specifically, under the control of the upper layer monitoring device, it transfers a part of the computing task to the upper layer monitoring device, where the upper layer monitoring device forwards the computing task to the low computing load device for processing.

In an embodiment, the computing task transferred-in module M1052 is configured to: if the cabinet monitoring device is the low computing load device and the device having the excessive computing load is another cabinet monitoring device, receive the computing task from the device having the excessive computing load for processing. Specifically, it receives the computing task from the device having the excessive computing load through the upper layer monitoring device, and processes the computing task.

In an embodiment, the computing task transferred-out module M1051 is configured to: if the cabinet monitoring device is the device having the excessive computing load and the low computing load device is another cabinet monitoring device, under the control of the upper layer monitoring device, receive the result of the computing task from the low computing load device. Specifically, under the control of the upper layer monitoring device, it receives the result of the computing task from the low computing load device through the upper layer monitoring device.

In an embodiment, the computing task transferred-in module M1052 is configured to, if the cabinet monitoring device is the low computing load device and the device having the excessive computing load is another cabinet monitoring device, under the control of the upper layer monitoring device, transmit the result of the computing task to the device having the excessive computing load. Specifically, under the control of the upper layer monitoring device, it transmits the result of the computing task to the upper layer monitoring device, where the upper layer monitoring device forwards the result of the computing task to the device having the excessive computing load.

In an embodiment, the cabinet monitoring apparatus further includes: a cabinet storage load monitoring module M106, a storage data transferred-out module M1071, and a storage data transferred-in module M1072.

The cabinet storage load monitoring module M106 is configured to monitor an available storage capacity of the cabinet monitoring device itself, and upload the monitored available storage capacity to the upper layer monitoring device.

The storage data transferred-out module M1071 is configured to, if the cabinet monitoring device is a device having an excessive storage load, transfer a part of data to a low storage load device for storage under control of the upper layer monitoring device.

The storage data transferred-in module M1072 is configured to, if the cabinet monitoring device is a low storage load device, receive data from a device having an excessive storage load and store the data under control of the upper layer monitoring device.

The device having the excessive storage load is a cabinet monitoring device or the upper layer monitoring device which has a current storage capacity lower than a predetermined storage capacity threshold. The device having the low storage load is a cabinet monitoring device or the upper layer monitoring device which is determined by the upper layer monitoring device and has a current storage capacity higher than the predetermined storage capacity threshold.

In specific implementations, the operation principle of the cabinet monitoring apparatus is similar to the method applied to the cabinet monitoring device, and is not repeated herein.

Figure 7:
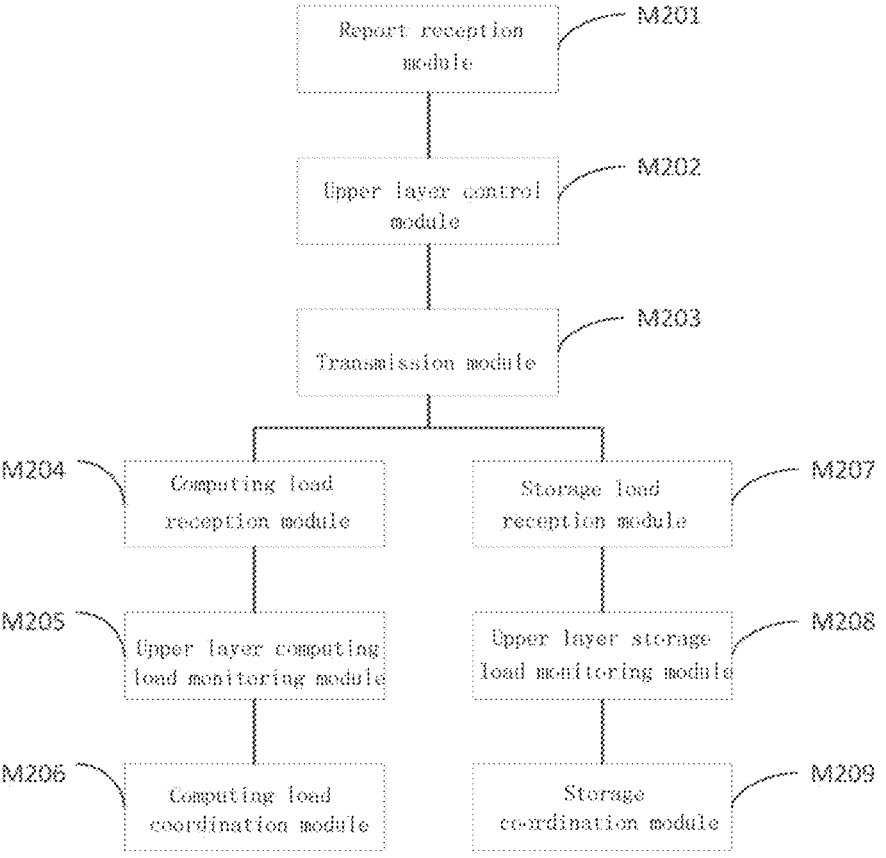
FIG. 7 is a schematic structural diagram of a cabinet monitoring apparatus applied to an upper layer monitoring device according to an embodiment of the present disclosure.

A cabinet monitoring apparatus is further provided according to an embodiment of the present disclosure. The cabinet monitoring apparatus is applied to an upper layer monitoring device. As shown in FIG. 7, the cabinet monitoring apparatus includes: a report reception module M201, an upper layer control module M202, and a transmission module M203.

The report reception module M201 is configured to receive monitoring data uploaded by a cabinet monitoring device.

The upper layer control module M202 is configured to generate upper layer control data based on the received monitoring data.

The transmission module M203 is configured to transmit the upper layer control data to the cabinet monitoring device.

In an embodiment, the cabinet monitoring apparatus further includes: a computing load reception module M204, an upper layer computing load monitoring module M205, and a computing load coordination module M206.

The computing load reception module M204 is configured to receive a current computing load uploaded by the cabinet monitoring device.

The upper layer computing load monitoring module M205 is configured to monitor a current computing load of the upper layer monitoring device itself.

The computing load coordination module M206 is configured to control a device having an excessive computing load to transfer a part of a computing task to a low computing load device for processing, and control the low computing load device to transmit a result of the computing task to the device having the excessive computing load.

The device having the excessive computing load is a cabinet monitoring device or the upper layer monitoring device that has a computing load exceeding a predetermined load threshold. The low computing load device is a cabinet monitoring device or the upper layer monitoring device that is determined by the upper layer monitoring device and has a computing load not exceeding the predetermined load threshold.

In an embodiment, if each of the device having the excessive computing load and the low computing load device is one of cabinet monitoring devices, the computing load coordination module M206 is configured to control the device having the excessive computing load to transfer a part of the computing task to the low computing load device for processing by: receiving the computing task uploaded by the device having the excessive computing load, and forwarding the computing task to the low computing load device; and/or the computing load coordination module M206 is configured to control the low computing load device to transmit the result of the computing task to the device having the excessive computing load by: receiving the result of the computing task uploaded by the low computing load device, and forwarding the result of the computing task to the device having the excessive computing load.

In an embodiment, the cabinet monitoring apparatus further includes: a storage load reception module M207, an upper layer storage load monitoring module M208, and a storage coordination module M209.

The storage load reception module M207 is configured to receive an available storage capacity uploaded by the cabinet monitoring device.

The upper layer storage load monitoring module M208 is configured to monitor an available storage capacity of the upper layer monitoring device itself.

The storage coordination module M209 is configured to control a device having an excessive storage load to transfer a part of data to a low storage load device for storage.

The device having the excessive storage load is a cabinet monitoring device or the upper layer monitoring device that has a current storage capacity lower than a predetermined storage capacity threshold, and the device having the low storage load is a cabinet monitoring device or the upper layer monitoring device that has a current storage capacity higher than the predetermined storage capacity threshold.

In specific implementations, the operation principle of the cabinet monitoring apparatus is similar to the method applied to the upper layer monitoring device, and is not repeated herein.

Figure 8:
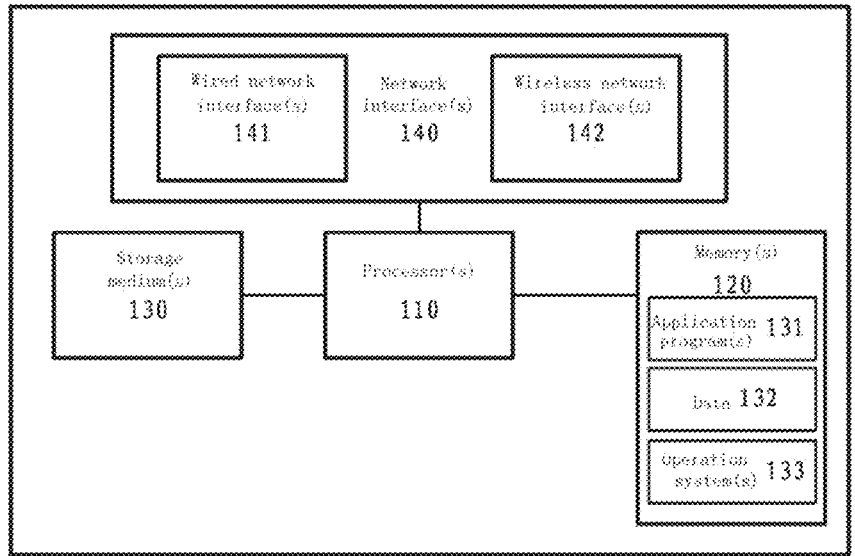
FIG. 8 is a schematic structural diagram of an upper layer monitoring device according to an embodiment of the present disclosure.
Figure 9:
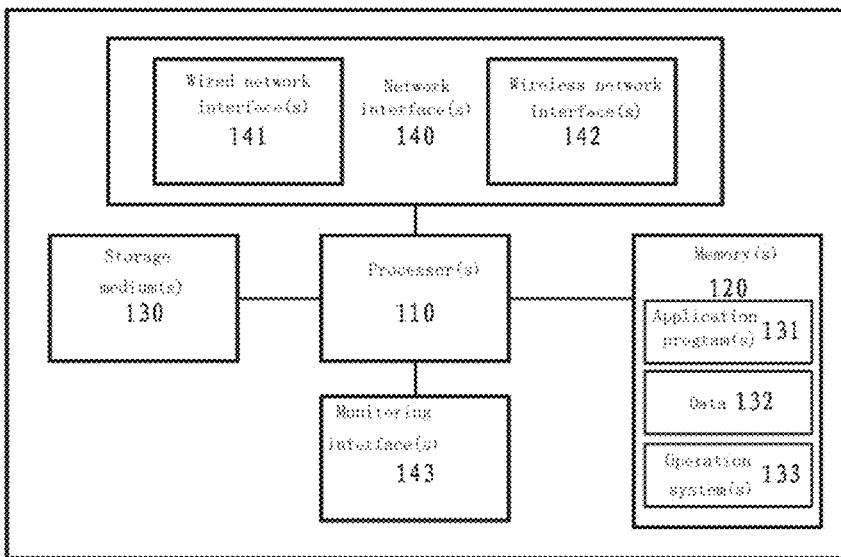
FIG. 9 is a schematic structural diagram of a cabinet monitoring device according to an embodiment of the present disclosure.

Based on the same concept, an electronic device is further provided according to an embodiment of the present disclosure. As shown in FIGS. 8 and 9, the electronic device includes: a processor 110 and a memory 120. The memory 120 stores instructions to be executed by the processor 110. The processor 110 is configured to execute the instructions to perform the cabinet monitoring method applied to the cabinet monitoring device (shown in FIG. 9) or the cabinet monitoring method applied to the upper layer monitoring device (shown in FIG. 8).

In specific implementations, the device may vary significantly due to different configurations or performance. The device may include one or more processors 110 and memories 120, and one or more storage media 130 for storing an application program 131 or data 132. The memory 120 and the storage medium 130 may be temporary or persistent storage. The application program 131 stored in the memory 120 or the storage medium 130 may include one or more of the above modules (not shown in FIGS. 8 and 9), each of the modules may include a series of instruction operations in an information processing apparatus. Furthermore, the processor 110 may be configured to communicate with the storage medium 130 and execute a series of instruction operations stored in the storage medium 130 on the device. The device may further include one or more power supplies (not shown in FIGS. 8 and 9), and one or more network interfaces 140. The network interfaces 140 include wired network interfaces 141 and/or wireless network interfaces 142 and/or one or more operation systems 133, such as Windows, Mac OS, Linux, IOS, Android, Unix, and FreeBSD. The wired network interface 141 may be an RS485 interface, an RS422 interface, a CAN bus interface and the like, which is not limited herein. The wireless interface 142 may be a WLAN interface, a Bluetooth interface, a ZigBee interface, a LoRa interface, a NB IoT interface, a 2G/3G/4G/5G cellular network interface and the like, which is not limited herein.

In specific implementations, as shown in FIG. 9, if the electronic device is the cabinet monitoring device, the cabinet monitoring device further includes one or more monitoring interfaces 143. The monitoring interfaces 143 includes analog input/output interfaces, digital input/output interfaces, USB interfaces, LCD, OLED and other display screen interfaces, and is not limited herein.

In specific implementations, the operation principle of the cabinet monitoring device is similar to the cabinet monitoring method, and is not repeated herein.

Based on the same concept, a computer storage medium is further provided according to an embodiment of the present disclosure. The computer storage medium stores a computer program. The computer program, when executed by a computer, causes the computer to perform the cabinet monitoring method applied to the cabinet monitoring device or the cabinet monitoring method applied to the upper layer monitoring device.

With the cabinet monitoring system, the cabinet monitoring method, the cabinet monitoring apparatus, the electronic device, and the computer storage medium according to the embodiments of the present disclosure, the upper layer monitoring device monitors the monitored devices in the cabinets by using the cabinet monitoring devices, greatly improving the access capability of the cabinet monitoring system, reducing the data processing capacity of the upper layer monitoring device for the same monitored device, and improving the data transmission speed of the upper layer monitoring device. Meanwhile, the cabinet monitoring devices are arranged in corresponding cabinets, which may simplify the connection of wiring and reduce the complexity for connecting the monitored devices to the cabinet monitoring system. Furthermore, the cabinet monitoring devices coordinates the computing task and storage with the upper layer monitoring device, which may utilize idle computing and storage resources, and thereby enhance the overall monitoring capability.

Those skilled in the art should understand that methods, systems, or computer program products may be provided according to the embodiments of the present disclosure. Therefore, this application may be provided in complete hardware embodiments, complete software embodiments, or embodiments combining software and hardware. Moreover, this application may be a computer program product implemented on one or more computer available storage media (including but not limited to disk storage, CD-ROM, and optical storage) storing computer available program codes.

This application is described with reference to flowcharts and/or block diagrams of a method, a device (system), and a computer program product according to this application. It should be understood that each process and/or box in a flowchart and/or block diagram and a combination of processes and/or boxes in the flowchart and/or block diagram may be implemented by computer program instructions. These computer program instructions may be provided to a processor of a general-purpose computer, a specialized computer, an embedded processor, or other programmable data processing device to generate a machine, so that a device, performing functions specified in one or more processes in a flowchart and/or functions specified in one or more blocks in a block diagram, is generated by performing instructions executed by the processor of the computer or other programmable data processing device.

These computer program instructions may be stored in computer readable memory that guides a computers or a programmable data processing device to operate in a specific way, so that a manufacturing product including instruction devices is produced based on the instructions stored in the computer readable memory. The instruction device performs the functions specified in one or more processes in the flowcharts and/or the functions specified one or more blocks in the block diagrams.

These computer program instructions may further be loaded onto a computer or other programmable data processing device, so that the computer or the other programmable data processing device performs a series of operations to perform computer-implemented processing. Thus, instructions executed on the computer or the other programmable device perform functions specified in one or more processes in the flowcharts and/or the functions specified one or more blocks in the block diagrams.

Apparently, those skilled in the art may make various modifications and variations to the present disclosure without departing from the principle of the present disclosure. If these modifications and variations to the present disclosure fall within the scope of the claims and equivalent technologies thereof, these modifications and variations also fall within the protection scope of the present disclosure.

The invention claimed is:

1. A cabinet monitoring system, comprising: an upper layer monitoring device and a plurality of cabinets, wherein
each of the cabinets comprises a cabinet monitoring device and a plurality of monitored devices connected to the cabinet monitoring device;
the upper layer monitoring device is connected to each of cabinet monitoring devices;
for each of the cabinet monitoring devices, the cabinet monitoring device is configured to: collect monitoring data of monitored devices connected to the cabinet monitoring device, generate cabinet control data based on a part of the monitoring data, transmit the cabinet control data to the monitored devices, upload a part of the monitoring data to the upper layer monitoring device, receive upper layer control data from the upper layer monitoring device, and forward the upper layer control data to the monitored devices; and
the upper layer monitoring device is configured to: receive monitoring data uploaded by each of cabinet monitoring devices, determine upper layer control data based on the received monitoring data, and transmit the upper layer control data to the cabinet monitoring device.

2. The cabinet monitoring system according to claim 1, wherein each of the cabinet monitoring devices is configured to:
collect raw monitoring data of the monitored devices connected to the cabinet monitoring device, convert a part of the raw monitoring data to final monitoring data in a unified predetermined format, and upload the final monitoring data to the upper layer monitoring device; and/or
receive upper layer raw control data from the upper layer monitoring device, convert the upper layer raw control data to final upper layer control data in a format corresponding to that of the monitored devices, and transmit the final upper layer control data to the monitored devices.

3. The cabinet monitoring system according to claim 1, wherein data is transmitted between the cabinet monitoring devices and the upper layer monitoring device in a transparent transmission mode.

4. The cabinet monitoring system according to claim 1, wherein
each of the cabinet monitoring devices is further configured to: monitor a computing load of the cabinet monitoring device itself, and upload the monitored computing load to the upper layer monitoring device; and
the upper layer monitoring device is further configured to: monitor a computing load of the upper layer monitoring device itself; and based on computing loads uploaded by the cabinet monitoring devices, control a device having an excessive computing load to transfer a part of computing task to a low computing load device for processing, and control the low computing load device to transmit the result of the computing task to the device having the excessive computing load; wherein the device having the excessive computing load is a cabinet monitoring device or the upper layer monitoring device that has a computing load exceeding a predetermined load threshold, and the low computing load device is a cabinet monitoring device or the upper layer monitoring device that is determined by the upper layer monitoring device and has a computing load not exceeding the predetermined load threshold.

5. The cabinet monitoring system according to claim 4, wherein
in a case that each of the device having the excessive computing load and the low computing load device is the cabinet monitoring device, the upper layer monitoring device is configured to: forward the computing task and/or the result of computing task between the device having the excessive computing load and the low computing load device.

6. The cabinet monitoring system according to claim 1, wherein
each of the cabinet monitoring devices is further configured to: monitor a current available storage capacity of the cabinet monitoring device itself and upload it to the upper layer monitoring device; and
the upper layer monitoring device is further configured to: monitor a current available storage capacity of the upper layer monitoring device itself, and control a device having an excessive storage load to transfer a part of data to a low storage load device for storage; wherein
the device having the excessive storage load is a cabinet monitoring device or the upper layer monitoring device that has a current storage capacity lower than a predetermined storage capacity threshold, and the device having the low storage load is a cabinet monitoring device or the upper layer monitoring device that has a current storage capacity higher than the predetermined storage capacity threshold.

7. A cabinet monitoring method applied to a cabinet monitoring device, comprising:
collecting monitoring data of monitored devices of the cabinet corresponding to the cabinet monitoring device, and uploading a part of the monitoring data to an upper layer monitoring device;
generating cabinet control data based on a part of the monitoring data, and transmitting the cabinet control data to the monitored devices;
receiving upper layer control data from the upper layer monitoring device, and transmitting the upper layer control data to the monitored devices.

8. The cabinet monitoring method according to claim 7, wherein
collecting monitoring data of monitored devices of the cabinet corresponding to the cabinet monitoring device and uploading a part of the monitoring data to an upper layer monitoring device comprising:
collecting, by the cabinet monitoring device, raw monitoring data of the monitored devices of the cabinet corresponding to the cabinet monitoring device, converting, by the cabinet monitoring device, a part of the raw monitoring data to final monitoring data in a unified predetermined format, and uploading, by the cabinet monitoring device, the final monitoring data to the upper layer monitoring device; and/or
receiving upper layer control data from the upper layer monitoring device and transmitting the upper layer control data to the monitored devices comprising:

receiving upper layer raw control data from the upper layer monitoring device, converting the upper layer raw control data to final upper layer control data in a format corresponding to the monitored devices, and transmitting the final upper layer control data to the monitored devices.

9. The cabinet monitoring method according to claim 7, further comprising:

monitoring a computing load of the cabinet monitoring device itself, and uploading the monitored computing load to the upper layer monitoring device;

in a case that the cabinet monitoring device is a device having an excessive computing load, under control of the upper layer monitoring device, transferring a part of the computing task to a low computing load device, and receiving a result of the computing task from the low computing load device; and in a case that the cabinet monitoring device is a low computing load device, under control of the upper layer monitoring device, receiving a computing task from a device having an excessive computing load for processing, and transmitting a result of the computing task to the device having the excessive computing load; wherein the device having the excessive computing load is a cabinet monitoring device that has a computing load exceeding a predetermined computing load threshold or the upper layer monitoring device, and the low computing load device is a cabinet monitoring device that is determined by the upper layer monitoring device and has a computing load not exceeding the predetermined computing load threshold or the upper layer monitoring device.

10. The cabinet monitoring method according to claim 9, wherein in a case that the cabinet monitoring device is the device having the excessive computing load and the low computing load device is another cabinet monitoring device, transferring a part of the computing task to a low computing load device for processing and receiving a result of the computing task from the low computing load device under control of the upper layer monitoring device comprises:

under the control of the upper layer monitoring device, transferring a part of the computing task to the upper layer monitoring device, wherein the upper layer monitoring device forwards the computing task to the low computing load device for processing;

in a case that the cabinet monitoring device is the low computing load device and the device having the excessive computing load is another cabinet monitoring device, the receiving a computing task from a device having an excessive computing load for processing comprises:

receiving the computing task from the device having the excessive computing load through the upper layer monitoring device, and processing the computing task; and/or in a case that the cabinet monitoring device is the device having the excessive computing load and the low computing load device is another cabinet monitoring device, under control of the upper layer monitoring device, receiving a result of the computing task from the low computing load device, comprises:

under the control of the upper layer monitoring device, receiving the result of the computing task from the low computing load device through the upper layer monitoring device; and in a case that the cabinet monitoring device is the low computing load device and the device having the excessive computing load is another cabinet monitoring device, under control of the upper layer monitoring device, transmitting a result of the computing task to the device having the excessive computing load, comprises:

under the control of the upper layer monitoring device, transmitting the result of the computing task to the upper layer monitoring device, wherein the upper layer monitoring device forwards the result of the computing task to the device having the excessive computing load.

11. The cabinet monitoring method according to claim 7, further comprising:

monitoring an available storage capacity of the cabinet monitoring device itself, and uploading the monitored available storage capacity to the upper layer monitoring device;

in a case that the cabinet monitoring device is a device having an excessive storage load, under control of the upper layer monitoring device, transferring a part of data to a low storage load device for storage; and in a case that the cabinet monitoring device is a low storage load device, under control of the upper layer monitoring device, receiving data from a device having an excessive storage load, and storing the data; wherein the device having the excessive storage load is a cabinet monitoring device that has a current storage capacity lower than a predetermined storage capacity threshold or the upper layer monitoring device, and the device having the low storage load is a cabinet monitoring device that is determined by the upper layer monitoring device and has a current storage capacity higher than the predetermined storage capacity threshold or the upper layer monitoring device.

12. A cabinet monitoring method applied to an upper layer monitoring device, comprising:

receiving monitoring data uploaded by a cabinet monitoring device;

generating upper layer control data based on the received monitoring data; and transmitting the upper layer control data to the cabinet monitoring device.

13. The cabinet monitoring method according to claim 12, further comprising:

receiving a computing load uploaded by the cabinet monitoring device;

monitoring a computing load of the upper layer monitoring device itself; and controlling a device having an excessive computing load to transfer a part of the computing task to a low computing load device for processing, and controlling the low computing load device to transmit a result of the computing task to the device having the excessive computing load; wherein the device having the excessive computing load is a cabinet monitoring device that has a computing load exceeding a predetermined load threshold or the upper layer monitoring device, and the low computing load device is a cabinet monitoring device that is determined by the upper layer monitoring device and has a computing load not exceeding the predetermined load threshold or the upper layer monitoring device.

14. The cabinet monitoring method according to claim 13, wherein in a case that each of the device having the excessive computing load and the low computing load device is one of cabinet monitoring devices, controlling a device having an excessive computing load to transfer a part of a computing task to a low computing load device for processing comprising:

receiving the computing task from the device having the excessive computing load, and forwarding the computing task to the low computing load device; and/or controlling the low computing load device to transmit a result of the computing task to the device having the excessive computing load comprising:

receiving the result of the computing task from the low computing load device, and forwarding the result of the computing task to the device having the excessive computing load.

15. The cabinet monitoring method according to claim 12, further comprising:

receiving an available storage capacity from the cabinet monitoring device;

monitoring an available storage capacity of the upper layer monitoring device itself; and controlling a device having an excessive storage load to transfer a part of data to a low storage load device for storage; wherein the device having the excessive storage load is a cabinet monitoring device that has a storage capacity lower than a predetermined storage capacity threshold or the upper layer monitoring device, and the device having the low storage load is a cabinet monitoring device that has a storage capacity higher than the predetermined storage capacity threshold or the upper layer monitoring device.

\* \* \* \* \*